UNITED STATES PATENT OFFICE 1,996,452

METHOD OF MAKING LIGHT WEIGHT CONCRETE OF HIGH STRENGTH

Erik B. Bjorkman, Montreal, Quebec, Canada

No Drawing. Application July 10, 1933, Serial No. 679,714. In Canada July 15, 1932

2 Claims. (Cl. 106—24)

My invention relates to the production of concrete of low weight and high insulation value which is particularly intended for use in the construction of high buildings, in which the reduction of the dead weight of the structure is a matter of great importance.

The modern trend in building construction towards increased height of the structures and higher demand for fireproofness, necessitating increased use of concrete in columns, floor arches, etc., has led to a tremendous increase in the absolute weight of the buildings. As a consequence thereof the expenditures on foundation work and on the carrying frame are very high, and the demand for greatest possible saving in the dead weight, wherever such saving may be made, has arisen. Particular attention has been directed towards the possibilities of decreasing the comparatively high weight of ordinary concrete by using light aggregates and by aerating or expanding the concrete. The latter method involves chemical and mechanical problems of often complicated nature, whereas the substitution of lighter aggregates for heavier ones does not interfere with already established construction methods, and therefore has been widely employed in order to lighten the volume weight of concrete.

The most commonly employed light weight concrete aggregate today is coal ashes or cinders which are waste products and consequently may be obtained at low cost. From a technical viewpoint this material is far from satisfactory, however, as it is lacking in strength and usually contains chemically active impurities of which sulphur is most detrimental, as there is always a danger that the sulphur will cause corrosion of steel reinforcement embedded in the concrete.

In order to eliminate this danger, as well as in order to provide a technically more satisfactory aggregate, methods have been developed according to which a porous light weight aggregate may be produced by burning clay or shale to incipient intumescence. The product thus obtained is mechanically strong and free from detrimental impurities, and is used instead of the sand and gravel or crushed stone normally employed in the manufacture of concrete. Owing to the porous nature of this aggregate the weight of the concrete may be considerably decreased thereby, although the cost of such concrete is far from low, which may be seen from the fact that an expensive heating process has to be employed in the production of the porous aggregate.

The object of the present invention is to produce a concrete that is fully equal in qualities with that made from such specially manufactured porous aggregates at a price that is materially lower, by reason of the fact that the aggregate employed may be produced at a very low cost. For this purpose I make use of an aggregate produced by treating molten blast furnace slag in such a manner that a product strongly resembling the porous aggregate made by burning clay or shale is obtained.

Blast furnace slag, as is well known, is a by-product of the manufacture of pig-iron. Considerable quantities of slag are formed in the process of smelting iron from the ore, and the disposal of this slag has heretofore generally been an item of expense to the steel industry. Therefore, it may as a rule be obtained at a very low price.

Attempts have been made heretofore to find uses for blast furnace slag as concrete aggregate. For instance, by letting the molten slag slowly cool and solidify, and by crushing and screening the resulting product, an aggregate has been obtained which has found extensive application in concrete manufacture instead of crushed rock or gravel. Concrete made in this manner has approximately the same characteristics as ordinary stone or gravel concrete, i. e. it is substantially non-porous and has approximately the same density as the latter, around 140 lbs. per cubic foot. Therefore, the use of air-cooled slag in concrete manufacture does not lead to saving in weight or improved insulation value.

It has also been suggested to use as aggregate the product obtained when molten slag is poured into a powerful and much larger stream of cold water, running down a chute. The sudden contact of the molten slag with the cold water causes the slag to solidify into porous granules which possess a certain degree of mechanical strength. A sieve test of the product obtained by this method of granulation will show that the granulate is so fine that practically all of its passes through an 8 mesh sieve, i. e. it corresponds in particle size to ordinary sand.

As is well known in the art of concrete manufacture the use of sand alone as aggregate does not result in concrete of satisfactory qualities. If two samples of concrete are made, one with sand only and the other with a properly graded mixture of sand and coarse aggregate, such as gravel or crushed stone, it will be found that the strength and permanence of the latter is far superior, assuming that the conditions of manufacture are otherwise equal. Similarly, the use of the slag granulate produced by pouring molten slag into a stream of water, as aggregate in the manufacture of concrete, results in the production of a weak concrete that easily crumbles on the surface when exposed to the effect of changing weather conditions or mechanical wear. In order to get satisfactory strength it is necessary to use a relatively large quantity of cement, whereby the cost of the concrete becomes high, and the saving in weight due to the use of a light aggregate is partially offset. Furthermore, in order to insure sufficient workability of the concrete slurry for cast-in-situ application in the construction of buildings, it is necessary to add comparatively more water to the mix than is required when other light weight aggregates, such as cinders and burnt clay or shale, are used, owing to the great fineness of this type of slag aggregate. As is well known in the art, the workability or flow of the concrete slurry is a factor of utmost importance in the practical application of the concrete. Unless the slurry fills every crevice of the formwork, the strength of the concrete structure becomes wholly independable and the success of the construction may be jeopardized. It is also well known, that the strength of concrete is directly dependent on the relation between the quantity of cement and the quantity of water in the mix, other conditions of manufacture being equal. The less water is used for a given quantity of cement, the stronger concrete is obtained, assuming that the concrete slurry still retains sufficient workability for placing in the forms. For these reasons, the necessity of using comparatively much water in concrete made from slag aggregate of the type described in the foregoing constitutes a serious drawback in the use of this material.

In order to eliminate the disadvantages referred to, I make use, in carrying my invention into effect, of an aggregate obtained by treating molten blast furnace slag in such a manner as to produce a granulate that is substantially composed of large particles having great mechanical strength.

Before proceeding to describe the novel method of granulation I employ, reference is made to the fact that when the molten slag is granulated according to the method described in the foregoing, the solidification of the slag into porous particles is caused by the sudden chilling of a solid stream of molten slag by its contact with cold water of vastly greater volume. As a result of the chilling, the interior stresses developing in the solidified slag cause the same to break up into very small particles which naturally become soaked with water and emerge from the granulation chute commingled with water. The granulated slag I employ in carrying my invention into effect contains comparatively little or no water when the process of granulation is completed. The main feature of the granulation process is the simultaneous disintegration of the stream of slag by mechanical means and cooling and solidification of the drops of slag thus formed. Thereby, large strong and porous particles varying in size from 2 inches down to impalpable dust are formed, and I have found the mechanical disintegration together with the chilling of the slag in the same operation a necessary condition for the production of such particles. If the slag stream is not broken up mechanically at the same time as it is chilled, the resulting granulate is either lacking in strength or of such great fineness as to make it unsuited as concrete aggregate.

The granulation is brought about in a special machine which may be constructed in different ways, as long as facilities are provided for disintegration and chilling in one operation. One way of constructing the granulation machine is to provide a hull of iron against which the molten slag is thrown, either by means of a blast of compressed air directed against the stream of molten slag, or by means of revolving steel vanes operating in the path of the stream of molten slag, thereby disintegrating the slag and throwing it against the surrounding iron hull. If a blast of air is used for the breaking-up of the slag stream, the chilling action of the air serves to solidify the slag as well, and this action may be enhanced by letting the air blast carry with it a spray of water, or steam, and by spraying cold water on the iron hull. If revolving vanes are used to effect the disintegration, the slag is chilled by spraying water on the same. The granulate emerging from the latter type of granulating machine contains up to 10% of water, which soon evaporates owing to the high temperature of the granulate. The product emerging from the former type of granulation machine is dry. By regulating the force of the air blast or the speed of the revolving vanes and the quantity of water sprayed on the molten slag, it is possible to vary the relative sizes of the resulting granules within certain limits. Substantially, however, the granulate emerging from the granulation machine is composed of the following grades of particles:

| Grade | Percent of total by weight | Approximate volume weight |
|---|---|---|
| | | *Pounds per cubic foot* |
| Coarser than 2-mesh sieve | 15 | 25 |
| Between 2- and 4-mesh sieve | 25 | 30 |
| Between 4- and 8-mesh sieve | 20 | 40 |
| Finer than 8-mesh sieve | 40 | 60 |

It will be seen that, substantially, more than one half of the material is too coarse to pass through an 8 mesh sieve. The individual particles have great mechanical strength, although their degree of porosity is high and the volume weight of the material is remarkably low, on an average less than 40 lbs. per cubic foot for the mixed granulate. The particles of slag being too coarse to pass the 8 mesh sieve, i. e. having a larger diameter than $\frac{1}{8}''$, are particularly hard and capable of withstanding great pressure before crushing.

The molten slag having been turned into granulate as described, the next step in the production of concrete of light weight according to the invention has to do with the grading of the granulate so as to produce an aggregate of determinate and desired particle sizes. It is obvious that the granulate may be mixed directly with Portland cement and water and serve as aggregate in its natural form. I have found, however, that by properly grading the granulate and re-apportioning the various grades so as to meet definite requirements, I am able to materially increase the compressive strength of the finished concrete without increasing its weight and without interfering with the workability of the concrete slurry. For this reason, the granulate emerging from the granulation mill is subjected to a screening operation and separated into different grades. The particle size of the grades may of course vary for different types of concrete. However, I have found that generally the division of the granulate into the following grades of particles enables me to produce an aggregate by re-apportioning the different grades that answers particularly well to practical requirements incidental to the production of light weight concrete:

Grade 1: Particles retained on the 2 mesh sieve.
Grade 2: Coarse grade. Particles passing the 2 mesh sieve but retained on the 4 mesh sieve.
Grade 3: Medium coarse grade. Particles passing the 4 mesh sieve but retained on the 8 mesh sieve.
Grade 4: Fine grade. Particles passing the 8 mesh sieve.

Grade 1, composed of particles retained on the 2 mesh sieve, comprises generally only about 15% of the total by weight, and the individual particles vary greatly in size. In order to bring them to a uniform size they are run through a crusher that brings them down to the approximate size of the particles composing Grade 2. The crushed particles are again screened and distributed according to size in Grades 2–4.

An examination of the individual particles of the different grades will show that the particles retained on the 8 mesh sieve have considerable mechanical strength, particularly the particles retained on the 4 mesh sieve, and are also very light, whereas the fine particles composing Grade 4 are weaker and relatively heavy. This latter grade of particles resembles closely the product obtained when molten slag is granulated in running water, as described above.

Reference has been made to the fact that concrete, of any kind, that is made from a properly graded mixture of fine and coarse aggregates proves most satisfactory in regard to strength and permanence when set, as well as in regard to ease of placing the concrete slurry. Similarly, it will be found that concrete made from a properly graded mixture of fine and coarse slag aggregate will be superior to concrete made from fine slag only, conditions of manufacture being otherwise equal. I have found, however, that if the same relative proportions of fine and coarse slag aggregate are used, as is common in making concrete from ordinary sand and gravel or crushed stone, the comparatively low mechanical strength of the particles composing the fine grade affects the strength appreciably. Consequently, it is desirable to decrease the proportion of fine slag aggregate, which of course may be done by substituting ordinary sand for part or all of the fine slag. Although the strength of the concrete will be increased thereby, it is obvious that the density will also increase, in view of the fact that ordinary sand weighs considerably more than the fine slag aggregate.

It is well known that fine aggregates in general serve as a medium between the exceedingly fine cement particles and the coarse aggregate. For a definite cement content and water-cement ratio, changes in the proportion of fine compared to coarse aggregates will lead to changes in the workability of the concrete slurry. When the proportion of fine aggregate is decreased, the concrete slurry becomes gritty, to the detriment of the ultimate strength of the concrete, unless the decrease in fine aggregate is offset by a corresponding increase in the proportion of cement. It is obvious that the more cement is used in the mix, the more costly the concrete becomes.

I have found that the disadvantages referred to may be overcome by grinding part of the grade of slag passing the 8 mesh sieve to cement fineness and adding thereof to the mix. The greater relative quantity of exceedingly fine particles thus obtained enables me to also increase the quantity of coarse aggregate without changing the workability of the concrete slurry, thereby materially increasing the strength of the concrete without increasing its density, by reason of the fact that the greater proportion of the relatively lighter coarse aggregate particles offsets the increase in density that would take place due to the addition of ground, and in consequence thereof, non-porous slag particles. Moreover, not only does the concrete become stronger owing to the larger proportion of strong coarse aggregate particles, but the finely ground slag particles participate themselves in the setting action in the same manner, and almost to the same extent, as the Portland cement particles. This important result is due to the fact that granulated blast furnace slag is, from a chemical viewpoint, substantially the same composite material as Portland cement, although deficient in lime. Reduced to the fineness of Portland cement, it shows great hydraulic activity, provided the deficiency in lime is counteracted by the presence of free lime in some form in the mix. When ground slag is mixed with Portland cement and water, such free lime is provided, by reason of the fact that the Portland cement itself contains chemically active free lime. The action of the lime in the Portland cement may of course be further enhanced by adding a small quantity of hydrated lime to the mix, although as a rule satisfactory setting action takes place in the slag without such addition.

Having separated the granulate into grades, as pointed out, I therefore grind part of the grade of particles passing the 8 mesh sieve to cement fineness, and add the ground slag to the concrete mix. I have found that as long as the weight of the ground slag does not exceed 25% of the weight of the Portland cement, the effect of the addition of the slag on the strength will be practically the same as if Portland cement in equal amounts had been added. If more than 25% of ground slag by weight of the Portland cement is added, the hardening of the concrete in the early stages is slower than if equal amounts of Portland cement were added instead of the ground slag, although the ultimate strength of the concrete will not differ greatly. In fact, I have found that as much as 70% of ground slag by weight of the cement may be added, and still give practically the same ultimate strength of the concrete as is attained when equal amounts of Portland cement are added instead of the slag.

By adding slag ground to the fineness of cement to the mix, as described, I am able to decrease the proportion of the fine grade of the mix to such an extent, that substitution of ordinary sand for the fine grade of slag aggregate may be done without materially increasing the volume weight or density of the concrete. The sand having greater mechanical strength than the fine slag, as pointed out, I am thus able to produce a concrete of substantially the same ultimate compressive strength as ordinary concrete, made with said and gravel or crushed rock as aggregates, the quantity of Portland cement employed in the mix and the workability of the concrete slurry being the same in both cases. This important result is due to the fact that, although the coarse slag particles have less mechanical strength than gravel and crushed rock particles, the setting action in the finely ground slag makes up for the loss in strength incurred by the use of a weaker aggregate. Concrete produced in this manner weighs approximately 40% less than ordinary concrete, in which sand and gravel or crushed rock serve as aggregates.
It should be noted that the operation of reducing the slag particles passing the 8 mesh sieve to cement fineness involves no considerable expense, as the particles already are very fine and are easily ground. The pulverized slag may be transported as any other aggregate, as it is practically inert even in the presence of moisture, unless chemically active free lime or other free bases are also present. Preferably the ground slag is re-mixed with the other grades of aggregate at the plant where it is prepared, and delivered to the user in this form.

Concrete suitable for structural purposes may be made by mixing 1 part by weight of Portland cement, ⅓ part of ground slag, 1½ parts of ordinary fine sand or 1 part of fine slag aggregate (Grade 4), ½ part of medium coarse slag aggregate (Grade 3), and 1½ parts of coarse slag aggregate (Grade 2). With a water-cement ratio of .8 lbs. of water per 1 lb. of Portland cement, the slump of the concrete slurry will be approximately 5 inches, as measured according to standard methods. The concrete will attain a compressive strength in excess of 2500 lbs. per square inch at the age of 28 days, and will weigh less than 100 lbs. per cubic foot in air dry condition.

For non-structural purposes, such as floor fill and similar applications, for which low weight and high insulation value of the concrete are more important qualities than high strength, the concrete mix may preferably be composed of 1 part of Portland cement by weight, 1 part of ground slag, 2 parts of fine slag aggregate (Grade 4), 2 parts of medium coarse slag aggregate (Grade 3), and 3 parts of coarse slag aggregate (Grade 2). This mix requires 2 lbs. of water per lb. of Portland cement for a comparatively dry consistency, such as is usually in placing concrete fills. The density of this concrete in air dry condition is only around 70 lbs. per cubic foot, and it is therefore highly resistant against the transmission of heat and sound.

The foregoing recommendations as to the proportion of cement, aggregate and water will serve to give a general outline of satisfactory concrete mixes from two different fields of application. It is obvious, that the proportions of the various ingredients may be varied to produce concrete of specific requirements. By reason of the fact, that the admixture of finely ground slag in the aggregate, acting as Portland cement in the process of hardening and thus increasing the strength, also makes it possible to employ a large proportion of coarse aggregate particles of great mechanical strength, concrete produced as described will attain considerably higher compressive strength for a given density than any light weight concrete heretofore made from blast furnace slag, or mixtures of blast furnace slag and ordinary sand, or, in fact, from any light weight aggregate. Furthermore, the qualities of concrete made according to the invention are fully equal with, or in fact, superior to those of light weight concrete made from Portland cement, water and aggregates specially manufactured by burning clay or shale to incipient fusion. The cost of the latter type of concrete is quite appreciably higher, as will be seen from the fact that the aggregate employed in its manufacture is prepared by first procuring the raw material, clay or shale, and then heating the same to a very high temperature, whereas the aggregate I employ in carrying my invention into effect is made by chilling the molten slag, which is a by-product of little or no value, the disposal of which generally constitutes an additional item of cost incidental to the manufacture of pig-iron.

Although concrete produced according to this invention is primarily intended for cast-in-situ construction, it has also proved very satisfactory for the manufacture of pre-cast units, particularly structural reinforced slabs for which concrete of high strength is required.

Owing to the porous nature of the aggregate, the insulation value of this concrete is high. As is well known, the lower weight a concrete has, i. e. the more air cells are trapped in its interior, the higher its resistance against the transmission of both heat and sound will be. For this reason, concrete made according to the invention is eminently suitable for the construction of floors according to standardized engineering practice. Such floors consist of a load-bearing slab of structural concrete and a fill of non-structural concrete serving as an insulating medium, particularly against the transmission of sound. Both the load-bearing slab and the fill may be constructed in concrete according to this invention, whereby an exceedingly light and sound-insulating floor is obtained.

Having thus described my invention, what I claim is:

1. The herein described method of making cast-in-situ concrete of lower weight than 115 pounds per cubic foot and substantially the same strength as that of normal heavy concrete containing equal proportion of Portland cement per unit volume, which comprises mechanically disintegrating a stream of molten blast furnace slag into drops of molten slag and chilling the drops to produce a granulate consisting of hard porous particles, separating said granulate into grades of particles of determinate and desired sizes, reducing the size of particles having larger diameter than substantially one half of an inch by crushing, reducing part of the grade of particles having smaller diameter than substantially one eighth of an inch to the fineness of Portland cement by grinding, adding the ground slag to the remainder of said grade in desired proportions, re-apportioning the grades into an aggregate composed of particles having smaller diameter than substantially one half of an inch, mixing said aggregate with Portland cement and water, and allowing the mixture to set.

2. The herein described method of making cast-in-situ concrete of lower weight than 115 pounds per cubic foot and substantially the same strength as that of normal heavy concrete containing equal proportion of Portland cement per unit volume as claimed in claim 1, with the addition of sand to the mixture of blast furnace slag, Portland cement and water.

ERIK B. BJORKMAN.